(12) United States Patent
Ladouceur et al.

(10) Patent No.: US 7,910,244 B2
(45) Date of Patent: Mar. 22, 2011

(54) EXPANDABLE BATTERY COMPARTMENT FOR HANDHELD ELECTRONIC DEVICES

(75) Inventors: Norman M. Ladouceur, Waterloo (CA); Jason T. Griffin, Kitchener (CA); Frank Tyneski, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/689,633

(22) Filed: Jan. 19, 2010

(65) Prior Publication Data
US 2010/0119922 A1 May 13, 2010

Related U.S. Application Data

(62) Division of application No. 11/245,020, filed on Oct. 7, 2005, now Pat. No. 7,687,197.

(51) Int. Cl.
*H01M 2/00* (2006.01)
*H01M 2/04* (2006.01)

(52) U.S. Cl. .............................. 429/163; 429/175; 429/9

(58) Field of Classification Search .................... None
See application file for complete search history.

(56) References Cited

U.S. PATENT DOCUMENTS

| | | | |
|---|---|---|---|
| 4,431,717 A | 2/1984 | Kikuchi et al. |
| 5,015,546 A | 5/1991 | Dulaney et al. |
| 5,744,930 A | 4/1998 | Fleming et al. |
| 6,048,642 A | 4/2000 | Woolsey |
| 6,203,363 B1 | 3/2001 | Yanaura |
| 6,228,528 B1 | 5/2001 | Burkholder et al. |
| 6,712,643 B2 | 3/2004 | Suzuki |
| 6,942,359 B2 | 9/2005 | Furth et al. |
| 2004/0206765 A1 | 10/2004 | McMahon et al. |
| 2004/0233625 A1 | 11/2004 | Saitou et al. |
| 2004/0245258 A1 | 12/2004 | Connors et al. |
| 2005/0272479 A1 | 12/2005 | Infanti |

FOREIGN PATENT DOCUMENTS

| | | |
|---|---|---|
| CA | 2315931 | 3/2001 |
| EP | 1468933 | 10/2004 |
| EP | 1603246 | 12/2005 |

OTHER PUBLICATIONS

Canadian Intellectual Property Office, Office Action for Canadian Patent App. No. 2,666,328, Oct. 29, 2009.
European Patent Office, Extended European Search Report for EP Patent App. No. 05109309.4, Apr. 4, 2006.
European Patent Office, Extended European Search Report for EP Patent App. No. 07104434.1, Dec. 28, 2007.
United States Patent and Trademark Office, Office Action for U.S. Appl. No. 11/245,020, Oct. 7, 2008.
Canadian Intellectual Property Office, Office Action for Canadian Patent App. No. 2,557,382, Oct. 28, 2008.
European Patent Office, Extended European Search Report for EP Patent App. No. 08166615.8, Mar. 13, 2009.
United States Patent and Trademark Office, Office Action for U.S. Appl. No. 11/245,020, Apr. 22, 2009.
European Patent Office, Extended European Search Report for EP Patent App. No. 10166947.1, Sep. 2, 2010.

*Primary Examiner* — Dah-Wei D Yuan
*Assistant Examiner* — Maria J Laios
(74) *Attorney, Agent, or Firm* — Borden Ladner Gervais LLP; Jeffrey W. Wong

(57) ABSTRACT

In a portable electronic device having a battery compartment and a removeable cover therefor, the battery compartment and cover are configured to accommodate batteries of at least two different sizes.

7 Claims, 9 Drawing Sheets

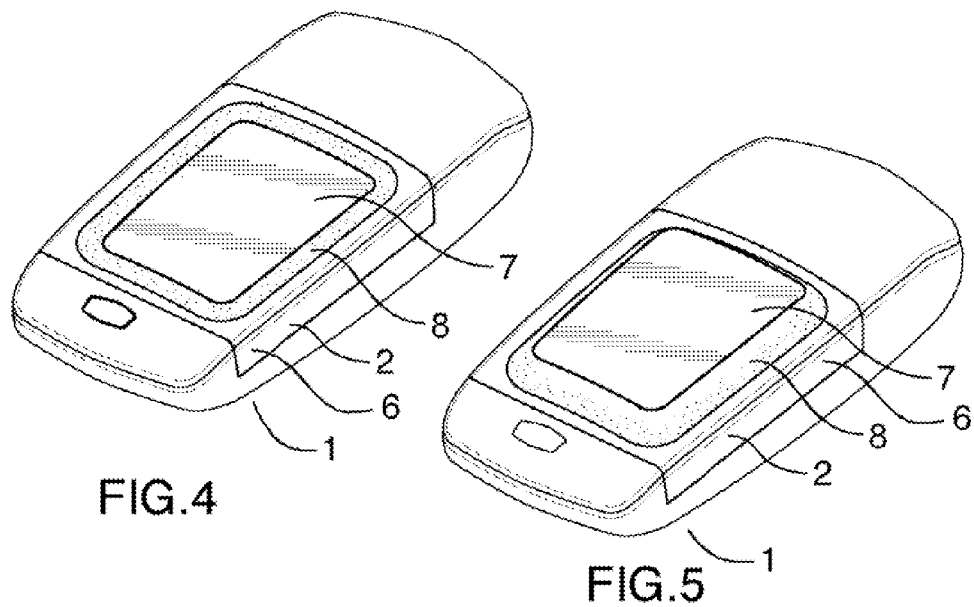
FIG.4
FIG.5
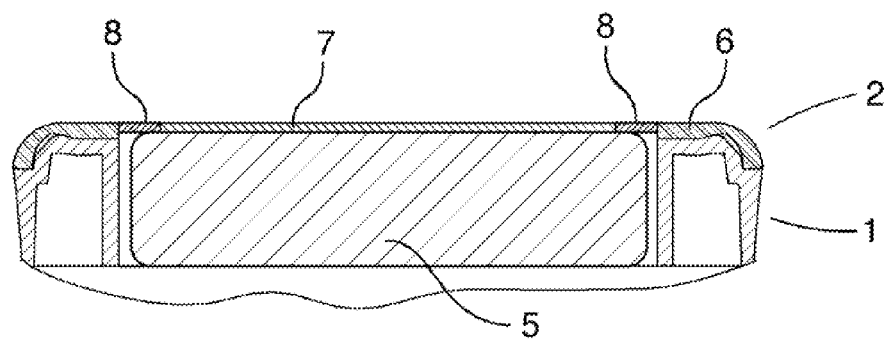
FIG.6
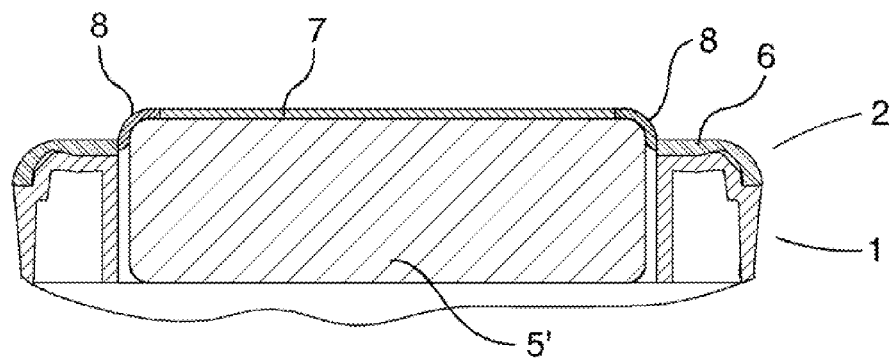
FIG.7

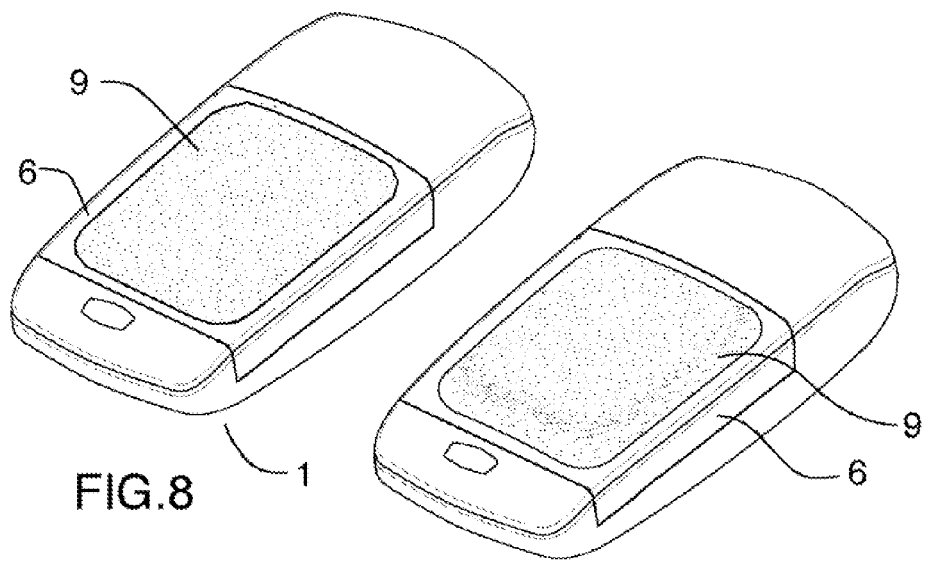
FIG.8
FIG.9
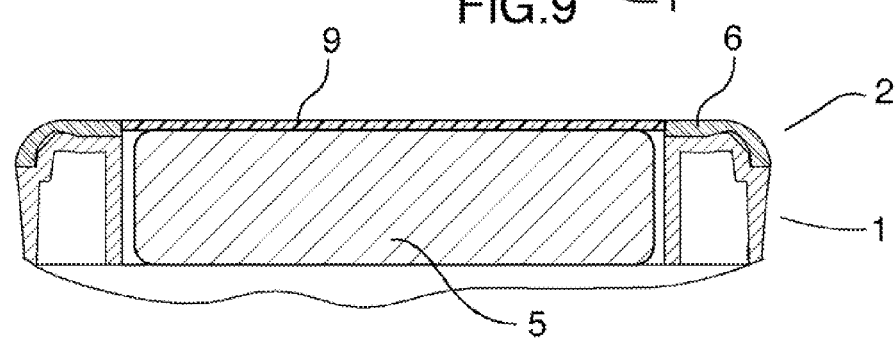
FIG.10
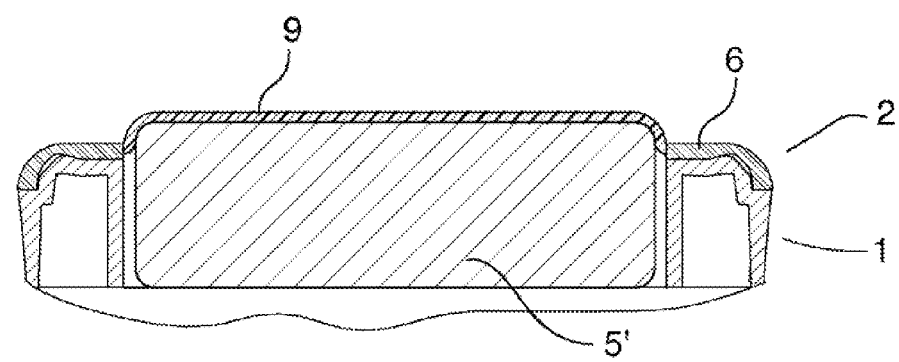
FIG.11

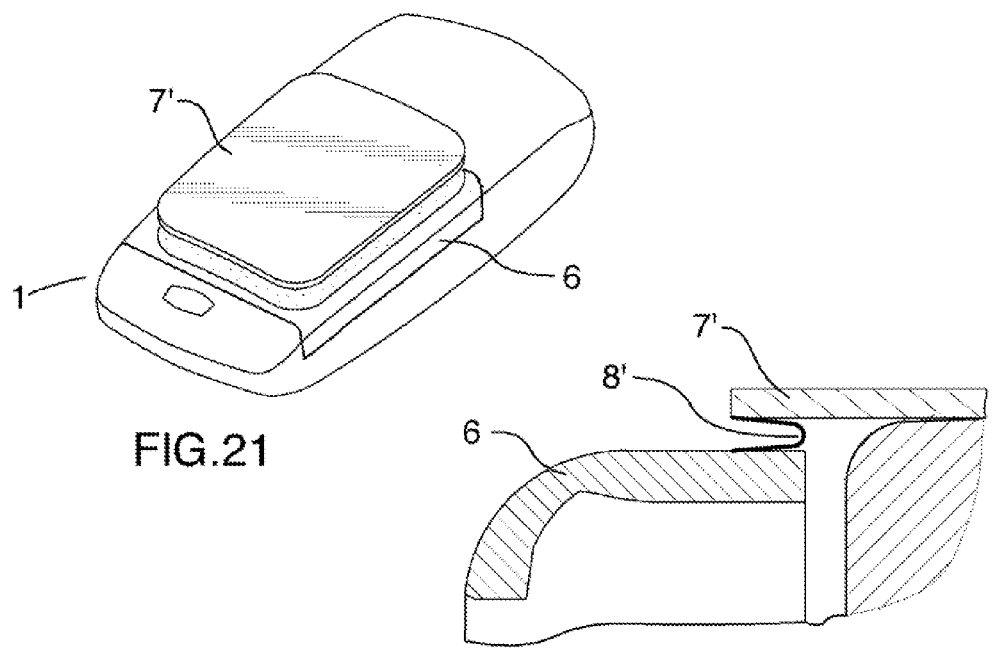
FIG.21
FIG.22
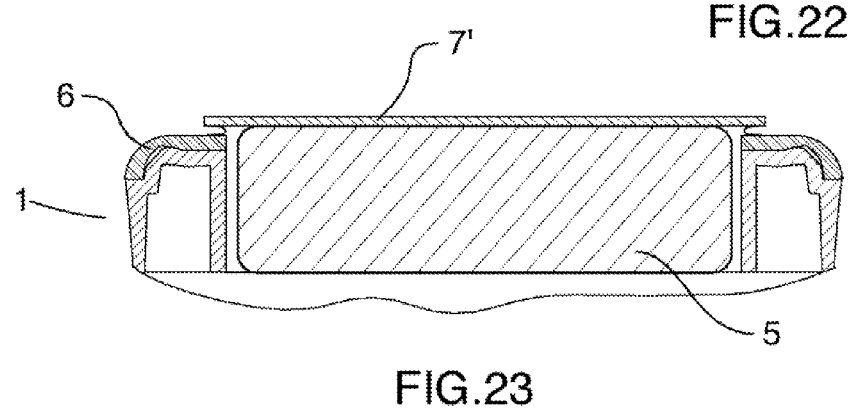
FIG.23
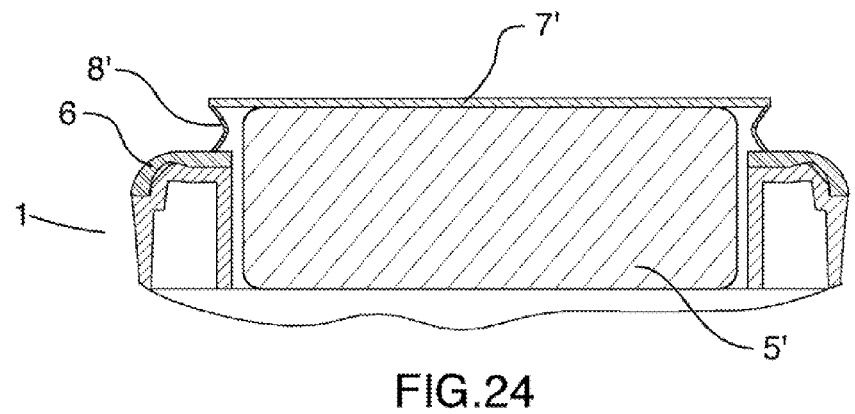
FIG.24

US 7,910,244 B2

EXPANDABLE BATTERY COMPARTMENT FOR HANDHELD ELECTRONIC DEVICES

CROSS-REFERENCE TO RELATED APPLICATION

This application is a division of U.S. patent application Ser. No. 11/245,020 filed Oct. 7, 2005, which is incorporated herein by reference in its entirety.

BACKGROUND OF THE INVENTION

This invention relates to portable electronic devices, including but not limited to handheld wireless communication devices. More particularly, this invention relates to means of accommodating batteries of different sizes in such devices.

Certain portable electronic devices, handheld wireless communication devices in particular, are designed to provide various battery life options, depending on different capacity batteries being used. Batteries of different capacity tend to have different physical dimensions. These differences in dimension are typically compensated for by providing battery area access doors of varying dimension, i.e. a separate battery door for each possible battery. It would be preferable to avoid such separate battery doors.

SUMMARY OF THE INVENTION

The invention therefore provides various means for accommodating batteries of different dimensions, without requiring separate battery doors.

Reference will be made to "relatively thin" batteries, and "somewhat thicker" batteries. It should be understood that "relatively thin" means relative to the thickness of the "somewhat thicker" batteries, and is not intended to indicate that the "relatively thin" battery is in fact thin compared to batteries in general.

Aspects of the invention will be described or will become apparent in the course of the following detailed description and drawings of specific embodiments of the invention, as examples only.

BRIEF DESCRIPTION OF THE DRAWINGS

Embodiments of the invention will now be described, by way of example only, with reference to the attached drawings, in which:

FIG. 4 is a perspective view of a second embodiment, with a relatively thin battery;

FIG. 5 is another perspective view of the second embodiment, with a somewhat thicker battery;

FIG. 6 is a cross-sectional elevation view of the second embodiment, with a relatively thin battery;

FIG. 7 is a cross-sectional elevation view of the second embodiment, with a somewhat thicker battery;

FIG. 8 is a perspective view of a third embodiment, with a relatively thin battery;

FIG. 9 is another perspective view of the third embodiment, with a somewhat thicker battery;

FIG. 10 is a cross-sectional elevation view of the third embodiment, with a relatively thin battery;

FIG. 11 is a cross-sectional elevation view of the third embodiment, with a somewhat thicker battery;

FIG. 21 is a perspective view of a seventh embodiment;

FIG. 22 is a cross-sectional elevation view of a portion of the seventh embodiment;

FIG. 23 is a cross-sectional elevation view of the seventh embodiment, with a relatively thin battery;

FIG. 24 is a cross-sectional elevation view of the seventh embodiment, with a somewhat thicker battery;

DETAILED DESCRIPTION OF THE INVENTION

The accompanying drawings illustrate various aspects and exemplary embodiments to accommodate batteries of different sizes.

Figure 1:
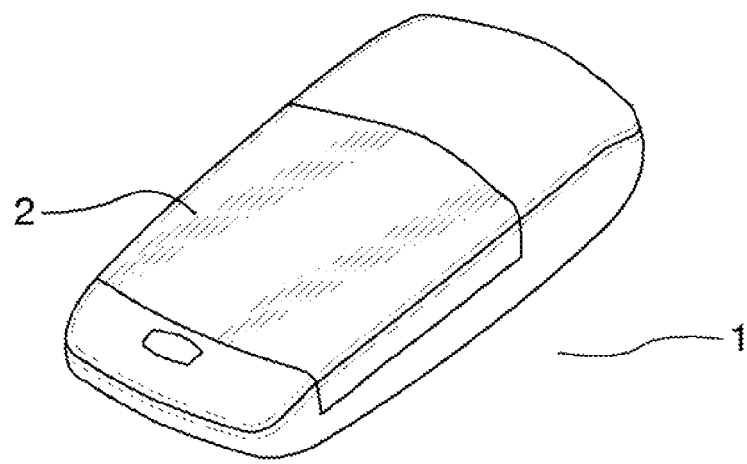
FIG. 1 is a perspective view of a first exemplary embodiment.
Figure 2:
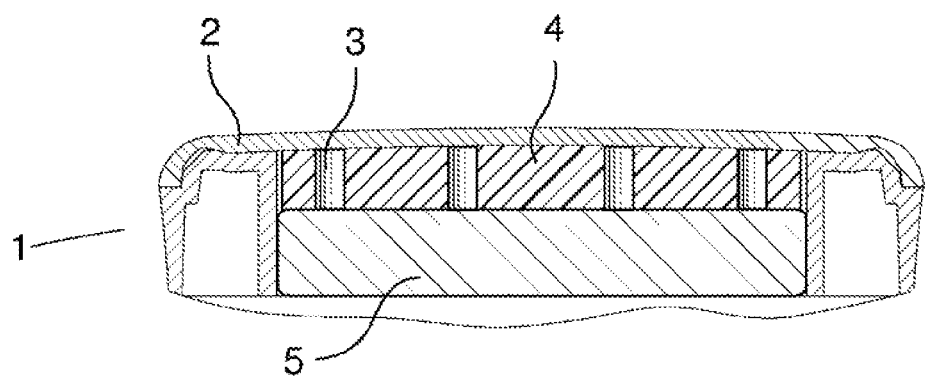
FIG. 2 is a cross-sectional elevation view of the first embodiment, with a relatively thin battery.
Figure 3:
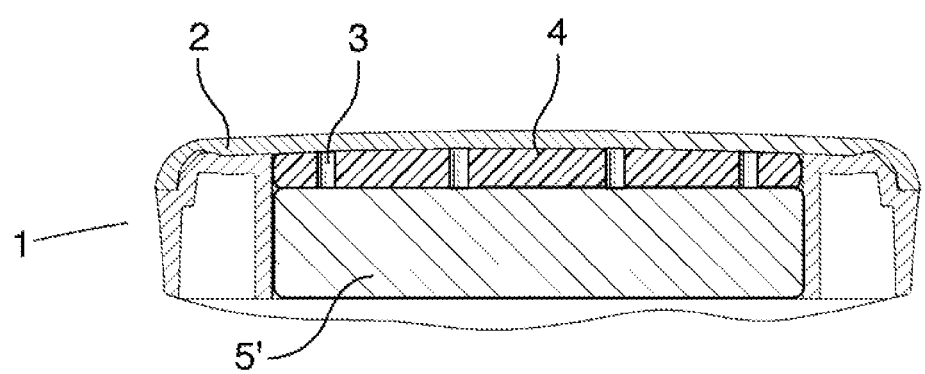
FIG. 3 is a cross-sectional elevation view of the first embodiment, with a somewhat thicker battery.

According to a first exemplary embodiment, as shown in FIGS. 1-3, the handheld device 1 with a cover 2 secured to the device by any suitable conventional means, over a battery compartment 3. Inside the battery compartment, under the cover, are one or more elastomeric elements 4, which bear against an installed battery, 5 or 5'. FIG. 2 shows a relatively thin battery 5, such that the elastomeric elements are not compressed, or are compressed only sufficiently to keep the battery in position. FIG. 3 shows a somewhat thicker battery 5', such that the elastomeric elements are somewhat compressed, the compression creating more space to accommodate the larger battery.

According to a second exemplary embodiment, as shown in FIGS. 4-7, the handheld device 1 has a cover 2 secured to the device by any suitable conventional means, over the battery compartment 3. The cover has a generally rigid outer frame 6, for example, of hard plastic or metal, and a generally rigid center portion 7, again, for example, of hard plastic or metal. An elastomeric web portion 8, molded with or otherwise connected to both the outer frame and the center portion, connects the outer frame and center portion. As can be seen from a comparison between FIGS. 4 and 5, or especially between FIGS. 6 and 7, the center portion 7 is in one position in FIGS. 4 and 6, relatively flat or generally co-planar with the outer frame 6 for example, to accommodate a relatively thin battery 5. In FIGS. 5 and 7, the elastomeric web 8 is stretched, and the center portion 7 is displaced outwardly, thereby accommodating a somewhat thicker battery 5'.

A third exemplary embodiment, similar to the second embodiment, is shown in FIGS. 8-11. In this embodiment, there is no generally rigid center portion. Instead, there is an elastomeric portion 9 secured to the outer frame 6, spanning across the battery compartment. As can be seen from a comparison between FIGS. 8 and 9, or especially between FIGS. 10 and 11, the elastomeric portion 9 is in one position in FIGS. 8 and 10, relatively flat or generally co-planar with the outer frame 6 for example, to accommodate a relatively thin battery 5. In FIGS. 9 and 11, the elastomeric portion 9 is stretched, particularly towards outer edges thereof, thereby accommodating a somewhat thicker battery 5'.

Figure 12:
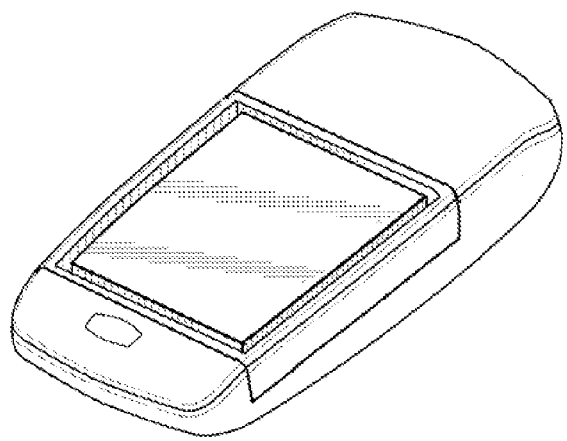
FIG. 12 is a perspective view of a fourth embodiment.
Figure 13:
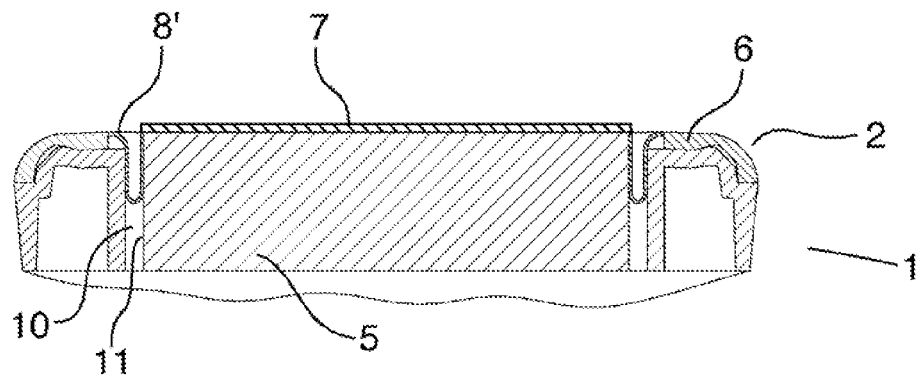
FIG. 13 is a cross-sectional elevation view of the fourth embodiment, with a relatively thin battery.
Figure 14:
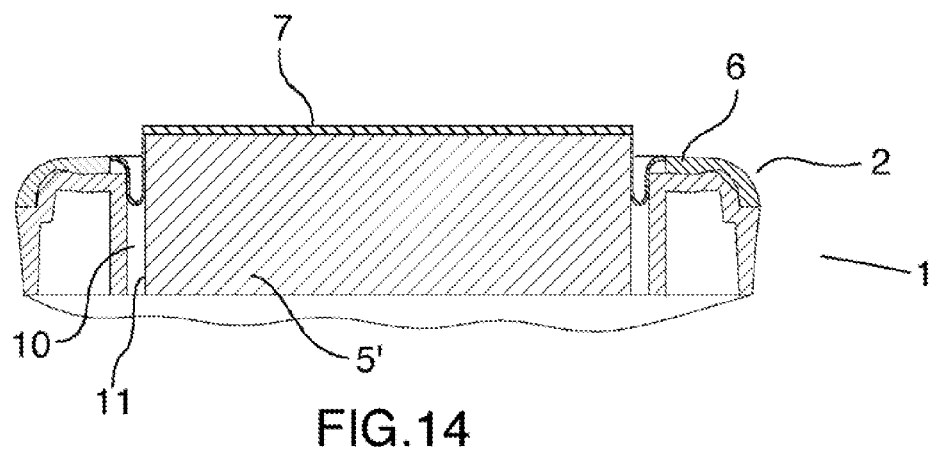
FIG. 14 is a cross-sectional elevation view of the fourth embodiment, with a somewhat thicker battery.
Figure 15:
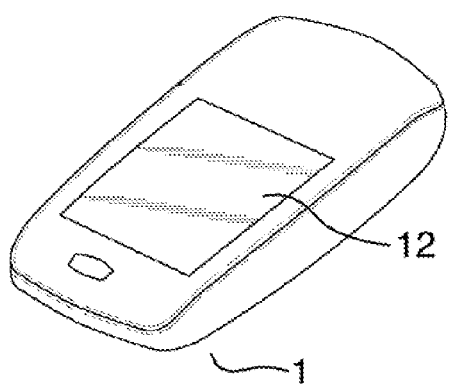
FIG. 15 is a perspective view of a fifth embodiment, with a relatively thin battery.
Figure 16:
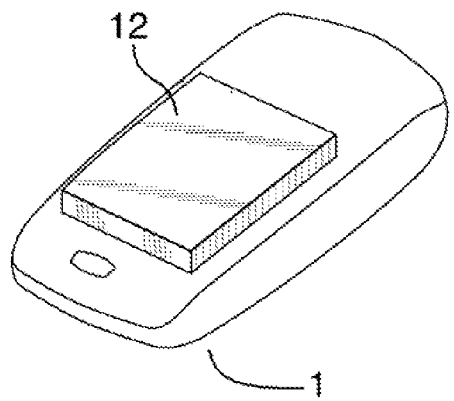
FIG. 16 is another perspective view of the fifth embodiment, with a somewhat thicker battery.
Figure 17:
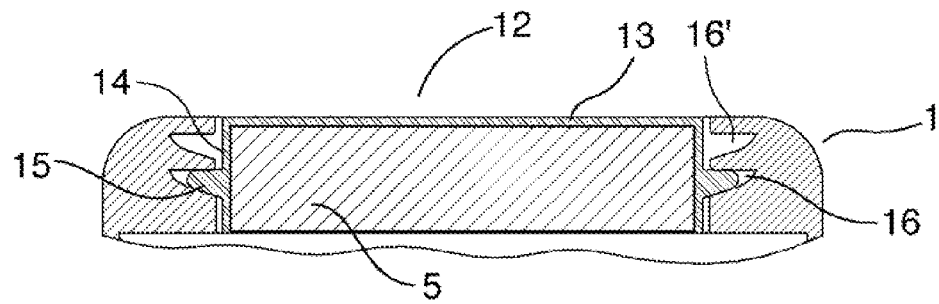
FIG. 17 is a cross-sectional elevation view of the fifth embodiment, with a relatively thin battery.
Figure 18:
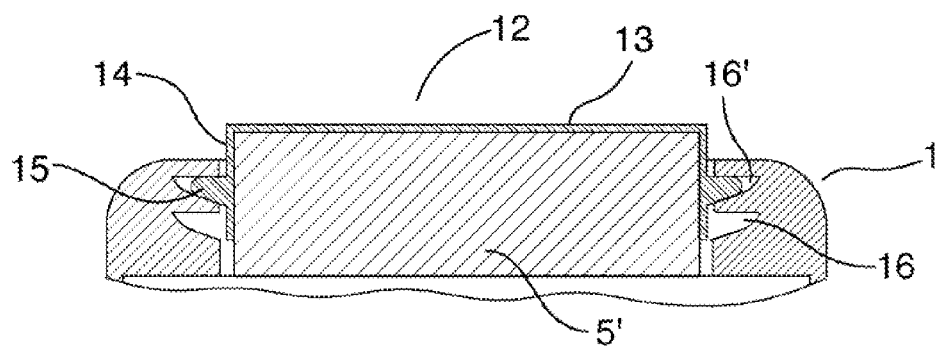
FIG. 18 is a cross-sectional elevation view of the fifth embodiment, with a somewhat thicker battery.

A fourth exemplary embodiment, also similar to the second embodiment, is shown in FIGS. 12-14. In this embodiment, the cover again has a generally rigid outer frame 6 and a generally rigid center portion 7, and the outer frame and center portion are again connected by an elastomeric web portion. However, the elastomeric web portion 8', is in the form of a flexible membrane, molded with or otherwise connected to both the outer frame and the center portion. The membrane tucks into a small gap 10 between the battery 5 or 5' and the side wall 11 of the battery compartment. As with the previous embodiments, FIGS. 13 and 14 show the comparison between accommodating a relatively thin battery 5 and a somewhat thicker battery 5'.

A fifth exemplary embodiment is shown in FIGS. 15-18. In this embodiment, a battery cover 12 has an outer surface 13 and side walls 14 encompassing the battery 5 or 5'. The battery cover preferably is generally rigid, but could be somewhat flexible. Extending outwardly from the side walls 14 are flexible engagement means 15 such as elastomeric or otherwise flexible tabs or a flange, which can engage corresponding recesses 16 or 16' at two or more relative heights. The battery cover is installed by pressing it downwardly into the battery compartment, such that the flexible engagement means snap or pop into the relevant recess or recesses. One recess height, shown in FIG. 17, corresponds to a relatively thin battery 5, while the other recess height, shown in FIG. 18, corresponds to a somewhat thicker battery 5'. There could be additional recess heights if desired. The flexible engagement means 15 could be tabs placed at several locations around the circumference of the battery cover, with recesses at corresponding locations, or could be in the form of a continuous flange extending all the way around the battery cover. The tabs or flange could be integral to the battery cover, or could be a separate piece. Although elastomeric tabs or an elastomeric flange are primarily contemplated, it should be appreciated that analogous means could be employed instead. For example, the battery cover could be provided with a ball-spring arrangement, to engage detents at different heights in the battery compartment, or the reverse could be provided, i.e. ball-spring arrangements in the battery compartment, engaging detents in the side walls of the battery cover.

Figure 19:
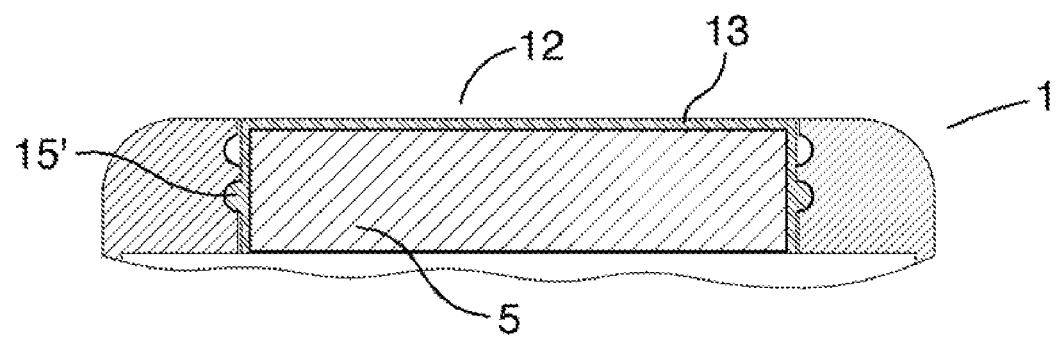
FIG. 19 is a cross-sectional elevation view of a sixth embodiment, similar to the fifth embodiment, with a relatively thin battery.
Figure 20:
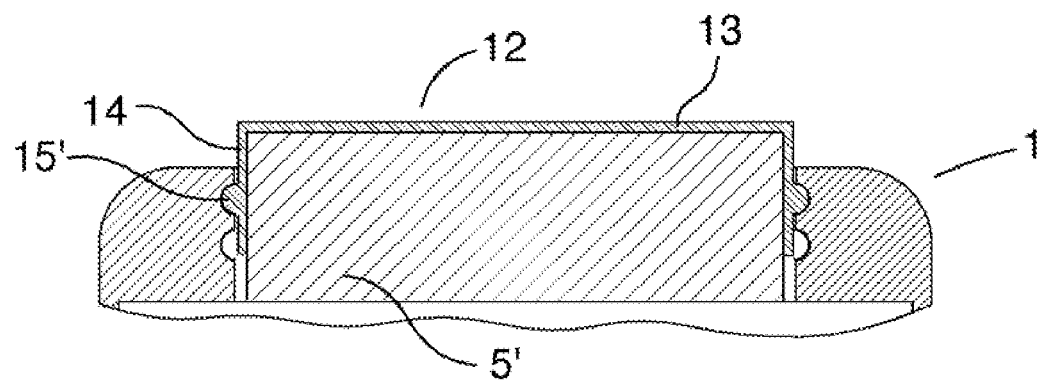
FIG. 20 is a cross-sectional elevation view of the sixth embodiment, with a somewhat thicker battery.

FIGS. 19 and 20 show a sixth exemplary embodiment, very similar to the preceding embodiment, in which the flexible engagement means 15 is in the form of elastomeric dimples engaging corresponding recesses. The ball-spring arrangement referred to above would be somewhat similar in concept and appearance.

FIGS. 21-24 show a seventh exemplary embodiment, similar in concept to the second and fourth embodiments in particular. In this embodiment, the cover has a generally rigid outer frame 6, for example of hard plastic or metal, and a generally rigid center portion 7', again for example of hard plastic or metal. The outer frame and center portion are connected by a web portion 8', molded with or otherwise connected to both the outer frame and the center portion. This web portion 8' is of a springy material, biased to the position shown in FIG. 23. To accommodate a somewhat thicker battery 5', the web portion 8' expands outwardly as shown in FIG. 24.

Figure 25:
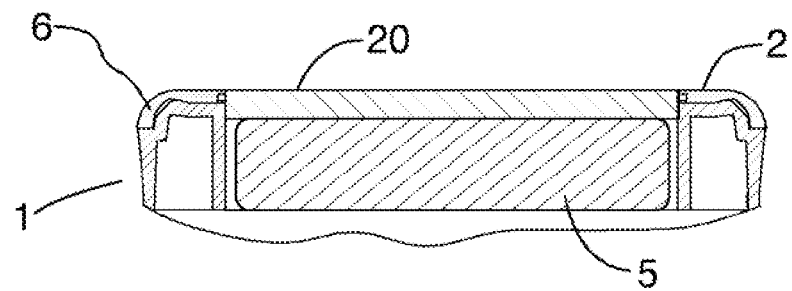
FIG. 25 is a cross-sectional elevation view of an eighth embodiment, with a relatively thin battery.
Figure 26:
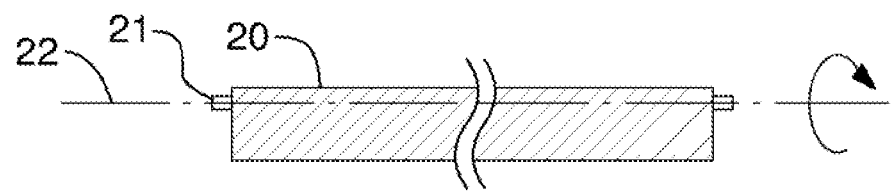
FIG. 26 is a cross-sectional elevation view of a portion of the cover of the eighth embodiment.
Figure 27:
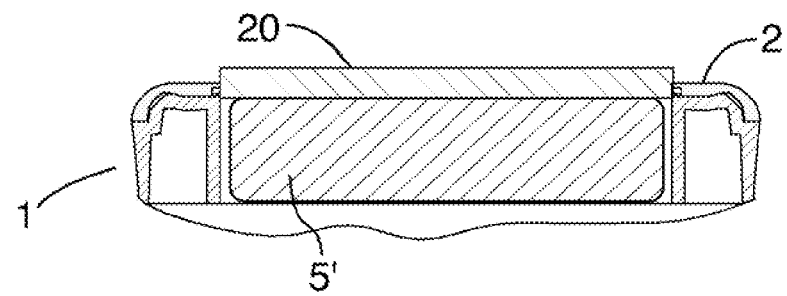
FIG. 27 is a cross-sectional elevation view of the eighth embodiment, with a somewhat thicker battery.
Figure 28:
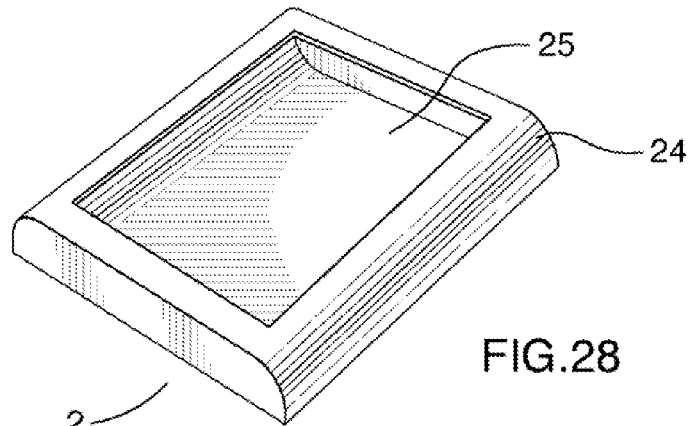
FIG. 28 is a perspective view of the battery cover of a ninth embodiment, in a position for a relatively thin battery.
Figure 29:
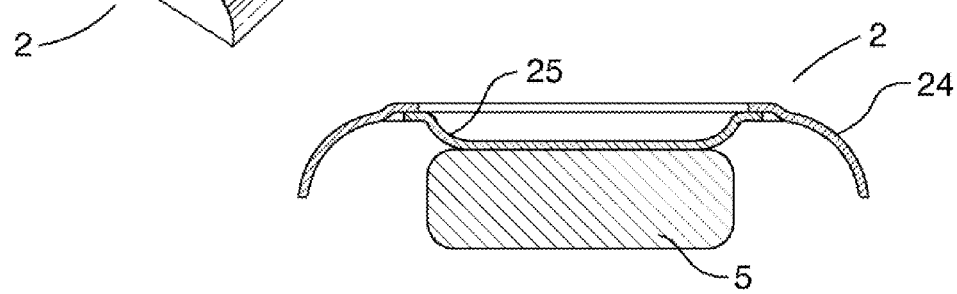
FIG. 29 is a cross-sectional elevation view the cover, corresponding to FIG. 28.
Figure 30:
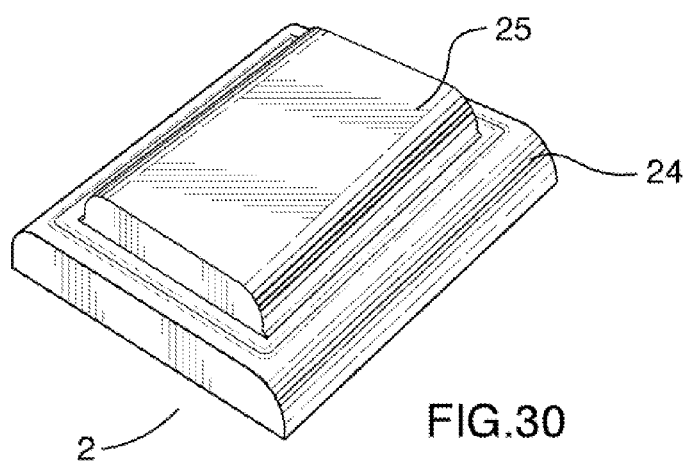
FIG. 30 is a perspective view of the battery cover of the ninth embodiment, in a position for a somewhat thicker battery.
Figure 31:
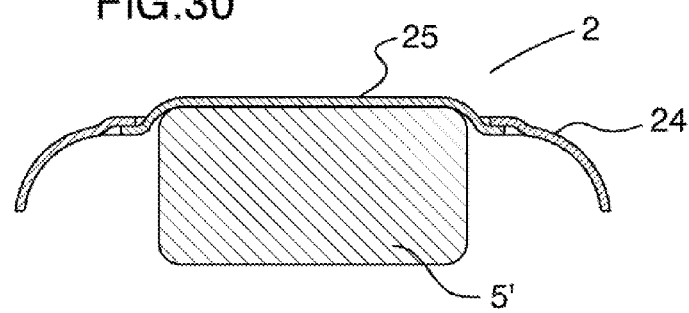
FIG. 31 is a cross-sectional elevation view of the cover, corresponding to FIG. 30.

FIGS. 25-27 show an eighth exemplary embodiment, in which the battery cover 20 itself, or a portion thereof, is reversible and has tabs or flanges 21 displaced from the centerline 22. As can be seen from comparing FIGS. 25 and 27, flipping the cover or cover portion thus creates a smaller or larger space for the battery 5 or 5'.

FIGS. 28-31 show a ninth exemplary embodiment, in which the battery cover 2 is in two pieces, namely an outer frame 24, and a central portion 25. As can be readily seen from the drawings, the center portion can be installed in one of two positions, according to a principle somewhat similar to the preceding embodiment. Depending on which orientation is used, a smaller or larger space for the battery 5 or 5' is created.

The preceding embodiments illustrate various aspects of the invention, but as examples only. It will be appreciated that many additional variations and examples are possible, and will be apparent to those knowledgeable in the field of the invention. Thus the scope of the invention, as defined in the following claims, is not limited to these specific examples.

Without limiting the generality of the foregoing, further aspects may include, for example, any other obvious variations as to how the battery cover may be configured or installed to provide varying battery compartment sizes; any obvious variations in choices of materials, degree of flexibility or resilience, if any, and any obvious variations in size, shape or other characteristics not relevant to the point of the invention. It should also be noted that although certain of the exemplary embodiments above lend them selves to discrete battery sizes only, others (for example embodiments with elastomeric elements) may lend themselves to a variety of battery sizes, along a continuum).

A portion of the disclosure of this document contains material, which is subject to copyright protection. The copyright owner has no objection to the facsimile reproduction by anyone of the patent document or disclosure, as it appears in the Patent Office file or public records, but otherwise reserves all copyright protection whatsoever.

The invention claimed is:

1. In a portable electronic device having a battery compartment and a removable cover therefor, the improvement comprising said battery compartment and cover being configured to accommodate batteries of at least two different sizes, wherein said cover has a generally rigid outer frame and a generally rigid center portion securable to said outer frame in either one of at least two positions, each said position corresponding to a different battery thickness, wherein said outer frame and center portion are connected by an elastomeric web portion whereby said center portion is displaced outwardly to accommodate a thicker battery.

2. The improvement of claim 1, wherein said elastomeric web portion is a flexible membrane, configured to tuck into a gap between the battery and a side wall of the battery compartment.

3. The improvement of claim 1, wherein said elastomeric web portion is of a springy material designed to expand and stretch between said outer frame and said center portion.

4. The improvement of claim 1, wherein said outer frame and center portion are formed of hard plastic.

5. The improvement of claim 1, wherein said outer frame and center portion are formed of metal.

6. The improvement of claim 1, wherein said at least two sizes are discrete sizes.

7. The improvement of claim 1, wherein said at least two sizes are various sizes along a continuum of sizes.

* * * * *